(12) United States Patent
Sheu

(10) Patent No.: US 8,843,000 B2
(45) Date of Patent: Sep. 23, 2014

(54) OPTICAL FIBER TRANSMISSION SYSTEM

(75) Inventor: Yi-Zhong Sheu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 115 days.

(21) Appl. No.: 13/585,964

(22) Filed: Aug. 15, 2012

(65) Prior Publication Data

US 2013/0163997 A1   Jun. 27, 2013

(30) Foreign Application Priority Data

Dec. 21, 2011   (TW) .............................. 100147854 A

(51) Int. Cl.
*H04B 10/278* (2013.01)
(52) U.S. Cl.
USPC ............................ 398/200; 398/166; 359/280
(58) Field of Classification Search
None
See application file for complete search history.

(56) References Cited

U.S. PATENT DOCUMENTS 5,610,749 A * 3/1997 Mizoguchi et al. ........... 398/166
6,094,293 A * 7/2000 Yokoyama et al. ........... 359/280

* cited by examiner

*Primary Examiner* — David Payne
*Assistant Examiner* — Omar S Ismail
(74) *Attorney, Agent, or Firm* — Novak Druce Connolly Bove + Quigg LLP

(57) ABSTRACT

An optical fiber transmission system includes a light emitting source, a plurality of light receiving terminals, and a plurality of optical fibers connecting the light emitting source to the light receiving terminals. The optical fiber transmission system further includes a plurality of controlling modules positioned between the light receiving terminals and the optical fibers. Each of the plurality of controlling modules includes a controller, a signal analyzer, and a reflective member. The signal analyzer and the reflective member are connected to the controller and analyze and reflect optical signals respectively.

6 Claims, 3 Drawing Sheets

OPTICAL FIBER TRANSMISSION SYSTEM

BACKGROUND

1. Technical Field

The present disclosure generally relates to optical fiber transmission systems, and particularly, to an optical fiber transmission system having a plurality of controlling modules.

2. Description of the Related Art

An optical fiber transmission system includes a light emitting source, a plurality of light receiving terminals, and a plurality of optical fibers connecting the light emitting source to the light receiving terminal. The optical fiber transmission system is divided into a series optical fiber transmission system and a radiating optical fiber transmission system. The series optical fiber transmission system has a main optical fiber connected to the light emitting source, and a plurality of branch optical fibers connecting the light receiving terminals to the main optical fiber. Due to transmission losses and insertion losses in the optical signal transmission, the optical signal is attenuated on the main optical fiber after a short transmission distance. Therefore, the optical signal only can be transmitted to a small number of light receiving terminals. The radiating optical fiber transmission system has a plurality of optical fibers connecting the light receiving terminals to the light emitting source. However, the optical signal can only be divided into a certain number of branching signals, and thus the radiating optical fiber transmission system can only have a small number of light receiving terminals.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

FIG. 2 is a schematic view of a controlling module of FIG. 1 allowing an optical signal to pass through.

DETAILED DESCRIPTION

Figure 1:
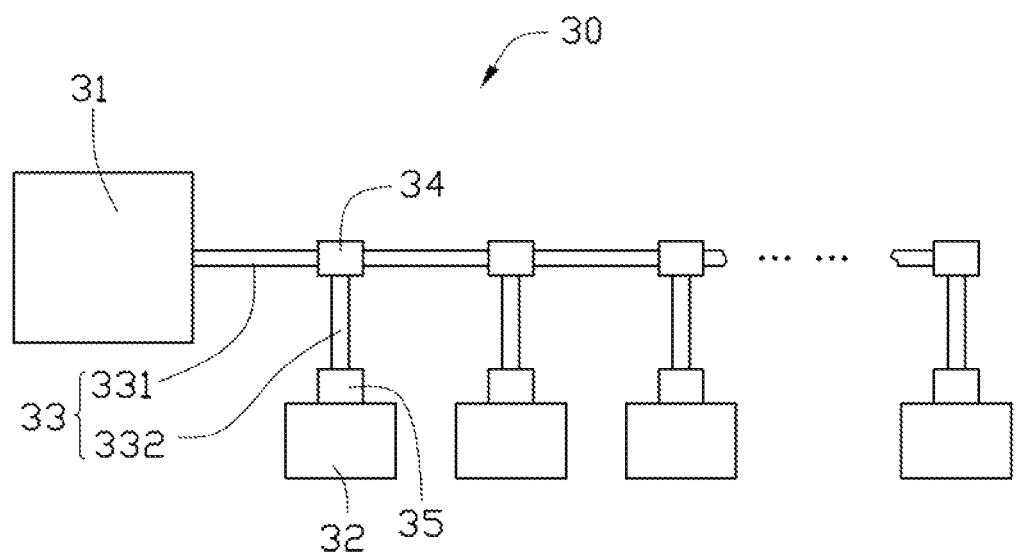
FIG. 1 is a schematic view of an embodiment of an optical fiber transmission system.

Referring to FIG. 1, an embodiment of an optical fiber transmission system 30 includes a light emitting source 31, a plurality of light receiving terminals 32, a plurality of optical fibers 33 connecting the light emitting source 31 to the light receiving terminals 32, a plurality of optical fiber connectors 34 connecting the optical fibers 33, and a plurality of controlling modules 35 positioned between the light receiving terminals 32 and the optical fibers 33. In the illustrated embodiment, the light emitting source 31 is a light emitting diode (LED), and the light receiving terminals 32 are computers.

The optical fibers 33 include a main optical fiber 331 and a plurality of branch optical fibers 332, and each branch optical fiber 332 is connected to the main optical fiber 331 via an optical fiber connector 34.

Figure 2:
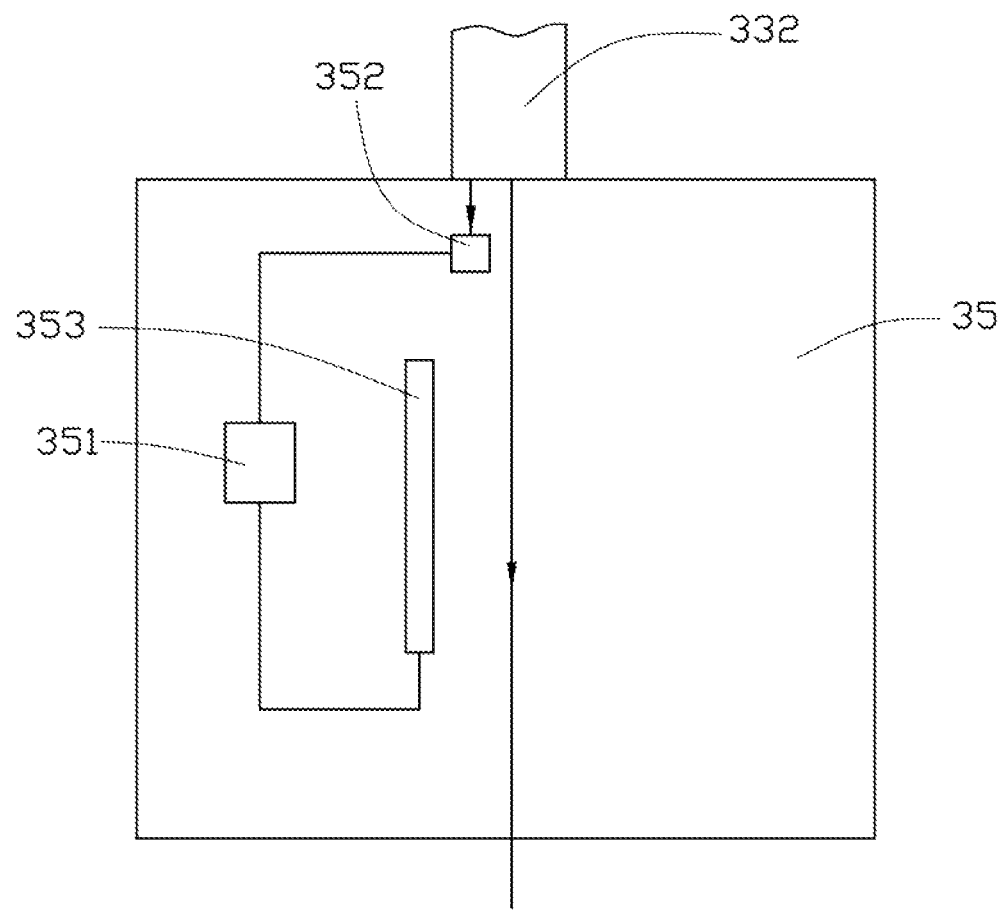
Figure 3:
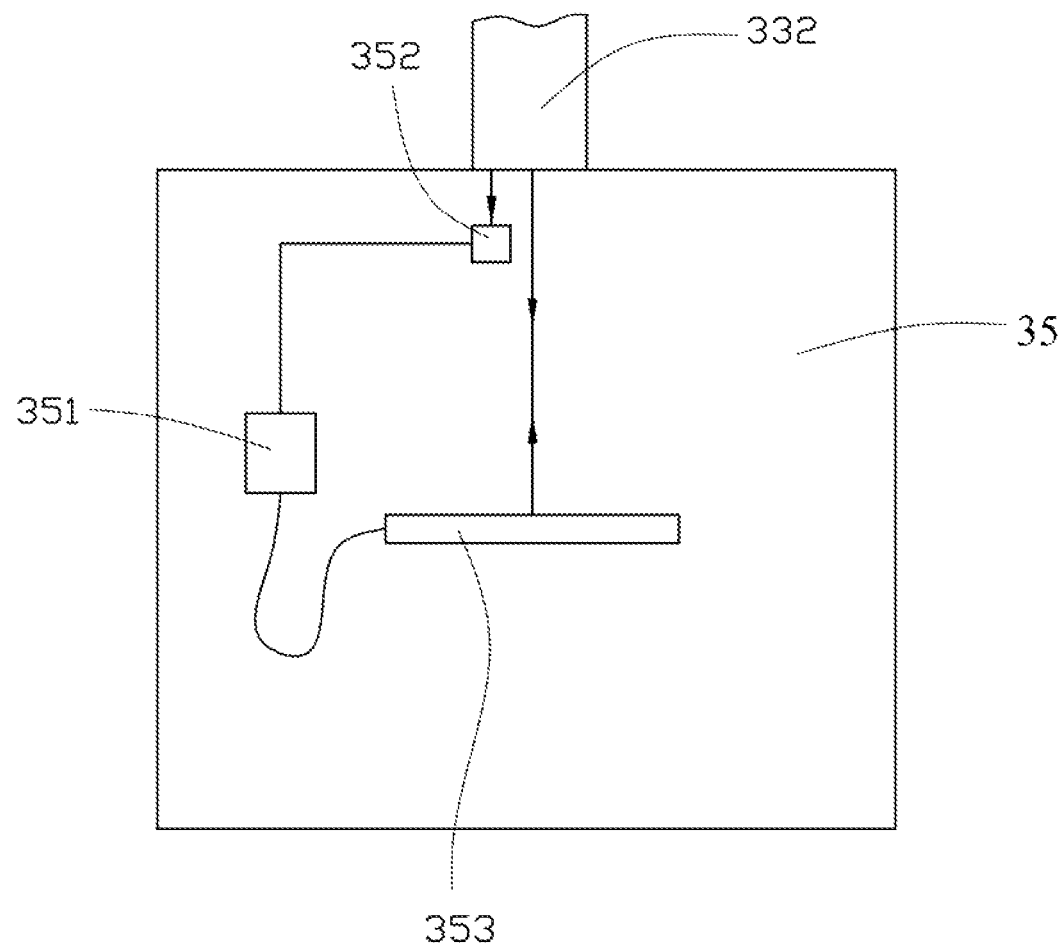
FIG. 3 is a schematic view of a controlling module of FIG. 1 reflecting an optical signal.

Referring to FIGS. 2 and 3, each controlling module 35 includes a controller 351, a signal analyzer 352, and a reflective member 353. The signal analyzer 352 and the reflective member 35 are connected to the controller 351. Each signal analyzer 352 stores a pre-set receiving address.

In use, the light emitting source 31 emits an optical signal to the branch optical fibers 332 via the main optical fiber 331 and the optical fiber connectors 34. The optical signal includes an aim address message. The optical signal is transmitted to the controlling modules 35 through the branch optical fibers 332. Each signal analyzer 352 receives the optical signal, and analyzes the aim address message included in the optical signal, then compares the aim address message with the pre-set receiving address stored in the signal analyzer 352. Referring to FIG. 2, if the aim address message corresponds to the pre-set receiving address, the optical signal is transmitted through the controlling modules 35, and allowed to enter into the light receiving terminal 32. Referring to FIG. 3, if the aim address message does not correspond to the pre-set receiving address, the signal analyzers 352 sends a starting signal to the controller 351, and then the controller 351 controls the reflective member 353 to rotate about 90 degrees by a motor (not shown) according to the starting signal. Then the optical signal is reflected back to the branch optical fiber 332 by the reflective member 353, thereby forming a stationary wave on the branch optical fiber 332.

The formation of stationary waves in the branch optical fibers 332 does not cause energy loss, the optical fiber transmission system 30 only expends energy in the branch optical fibers 332 if the aim address message does correspond to the pre-set receiving address of the branch optical fibers 332 and transmission is allowed. That is, the optical fiber transmission system 30 does not result in constant energy loss on every branch optical fibers 332, and thus the light emitting source 31 can be connected to more light receiving terminals 32.

In alternative embodiments, each signal analyzer 352 may store a pre-set format address, and compares the format incorporated in the optical signal with the pre-set format of the receiver stored in the signal analyzer 352. The controlling modules 35 may include two or more reflective members to reflect the optical signal back to the branch optical fibers 332.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An optical fiber transmission system, comprising:
a light emitting source;
a plurality of light receiving terminals,
a plurality of optical fibers connecting the light emitting source to the light receiving terminals; and
a plurality of controlling modules positioned between the light receiving terminals and the optical fibers; wherein each of the plurality of controlling modules comprises a controller, a signal analyzer, and a reflective member, the signal analyzer and the reflective member are respectively connected to the controller;
wherein the light emitting source generates an optical signal including an aim address message, the signal analyzer stores a pre-setting receiving address, and compares the aim address message with the pre-setting receiving address, if the aim address message corresponds to the pre-set receiving address, the optical signal is transmitted through the controlling modules and allowed to enter the light receiving terminal; and if the aim address message does not correspond to the pre-set receiving address, the signal analyzer sends a starting signal to the controller, and then the controller controls the reflective member to reflect the optical signal back to the optical fiber according to the starting signal.

2. The optical fiber transmission system of claim 1, wherein the plurality of optical fibers comprises a main optical fiber and a plurality of branch optical fibers connected to the main optical fiber, and the optical signal is reflected back to a corresponding branch optical fiber by the reflective member to form a stationary wave on the corresponding branch optical fiber.

3. The optical fiber transmission system of claim 2, wherein the branch optical fibers are connected to the main optical fiber via the optical fiber connectors.

4. The optical fiber transmission system of claim 1, wherein the light emitting source is a light emitting diode.

5. The optical fiber transmission system of claim 1, wherein the light receiving terminals are computers.

6. The optical fiber transmission system of claim 2, wherein the optical signal is reflected back to the corresponding branch optical fiber by rotating the reflective member about 90 degrees.

* * * * *